(12) United States Patent
Williamson et al.

(10) Patent No.: US 8,863,740 B2
(45) Date of Patent: Oct. 21, 2014

(54) HEAT PIPE FOR A SOLAR COLLECTOR

(75) Inventors: Thomas Patrick Williamson, Newtownabbey (IE); Boris Bauer, Bangor (IE); Paul Thomas McEntee, Belfast (IE)

(73) Assignee: Kingspan Holdings (IRL) Limited, Kingscourt, County Cavan (IE)

( * ) Notice: Subject to any disclaimer, the term of this patent is extended or adjusted under 35 U.S.C. 154(b) by 1392 days.

(21) Appl. No.: 12/450,625

(22) PCT Filed: Apr. 7, 2008

(86) PCT No.: PCT/IE2008/000041
§ 371 (c)(1), (2), (4) Date: Oct. 2, 2009

(87) PCT Pub. No.: WO2008/122968
PCT Pub. Date: Oct. 16, 2008

(65) Prior Publication Data
US 2010/0116265 A1    May 13, 2010

(30) Foreign Application Priority Data
Apr. 5, 2007  (GB) .................................. 0706700.2

(51) Int. Cl.
| F28D 15/00 | (2006.01) |
| F24J 2/32 | (2006.01) |
| F24J 2/46 | (2006.01) |
| F24J 2/40 | (2006.01) |
| F28D 15/06 | (2006.01) |
| F28D 15/02 | (2006.01) |

(52) U.S. Cl.
CPC .. *F24J 2/32* (2013.01); *Y02E 10/44* (2013.01); *Y02B 10/20* (2013.01); *F24J 2/4621* (2013.01); *F28D 15/06* (2013.01); *F28D 15/02* (2013.01)
USPC ........... 126/643; 126/663; 126/655; 126/670; 126/672; 236/56; 236/58; 236/93 R; 236/101 R; 251/324; 251/11; 165/51; 165/274

(58) Field of Classification Search
USPC .......... 126/643, 433, 589, 434; 165/274, 300, 165/56; 236/93 R, 101 R, 101 D
See application file for complete search history.

(56) References Cited

U.S. PATENT DOCUMENTS 4,032,070 A * 6/1977 Nielsen ........................ 236/92 B
4,586,655 A * 5/1986 Foller et al. ..................... 236/56
(Continued)

FOREIGN PATENT DOCUMENTS

DE   297 10 494   1/1998
EP   0 194 246    9/1986
(Continued)

OTHER PUBLICATIONS

UK Search Report dated May 9, 2008.
(Continued)

*Primary Examiner* — Steven B McAllister
*Assistant Examiner* — Nikhil Mashruwala
(74) *Attorney, Agent, or Firm* — Jacobson Holman, PLLC

(57) ABSTRACT

A heat pipe comprises an evaporator section 5 having a radiation absorbing plate 6 a portion of an elongate tube 7, and a condenser section 10 at a distal end of the elongate tube 7 remote from the evaporator section 5. A flow control valve 20 is provided between the evaporator section 5 and the condenser section 10 to selectively interrupt communication between said sections when the temperature within the condenser section 10 exceeds a predetermined maximum. A temperature sensitive member, (coil of memory metal 34', or discs 34') acts between a support plate 26 and a seat 36 located on a valve pintle 30 to urge the valve head 22 towards the valve seat 24 when the temperature of the temperature sensitive member 34 exceeds a predetermined limit. A return spring 38 is provided to bias the valve head 22 away from the valve seat 24.

13 Claims, 3 Drawing Sheets

(56) References Cited

U.S. PATENT DOCUMENTS

| | | | |
|---|---|---|---|
| 4,686,961 A * | 8/1987 | Garrison | 126/635 |
| 5,241,950 A * | 9/1993 | Mahdjuri-Sabet | 126/589 |
| 5,667,003 A * | 9/1997 | Mahdjuri-Sabet | 165/274 |
| 6,418,741 B1 * | 7/2002 | Nungesser et al. | 62/225 |
| 8,297,274 B2 * | 10/2012 | Davis et al. | 126/663 |
| 8,635,985 B2 * | 1/2014 | McAlister | 123/297 |
| 2006/0231235 A1 | 10/2006 | Yamanaka | |

FOREIGN PATENT DOCUMENTS

| | | |
|---|---|---|
| GB | 2 103 350 | 2/1983 |
| JP | 57104092 | 12/1980 |
| WO | WO 91/18252 | 11/1991 |
| WO | WO 92/18820 | 10/1992 |

OTHER PUBLICATIONS

International Search Report dated Aug. 5, 2008.

Mandjuri, F. "Solar collector with temperature limitation using shape memory metal," Renewable Energy 16(1-4), pp. 611-617, (Jan. 4, 1999).

* cited by examiner

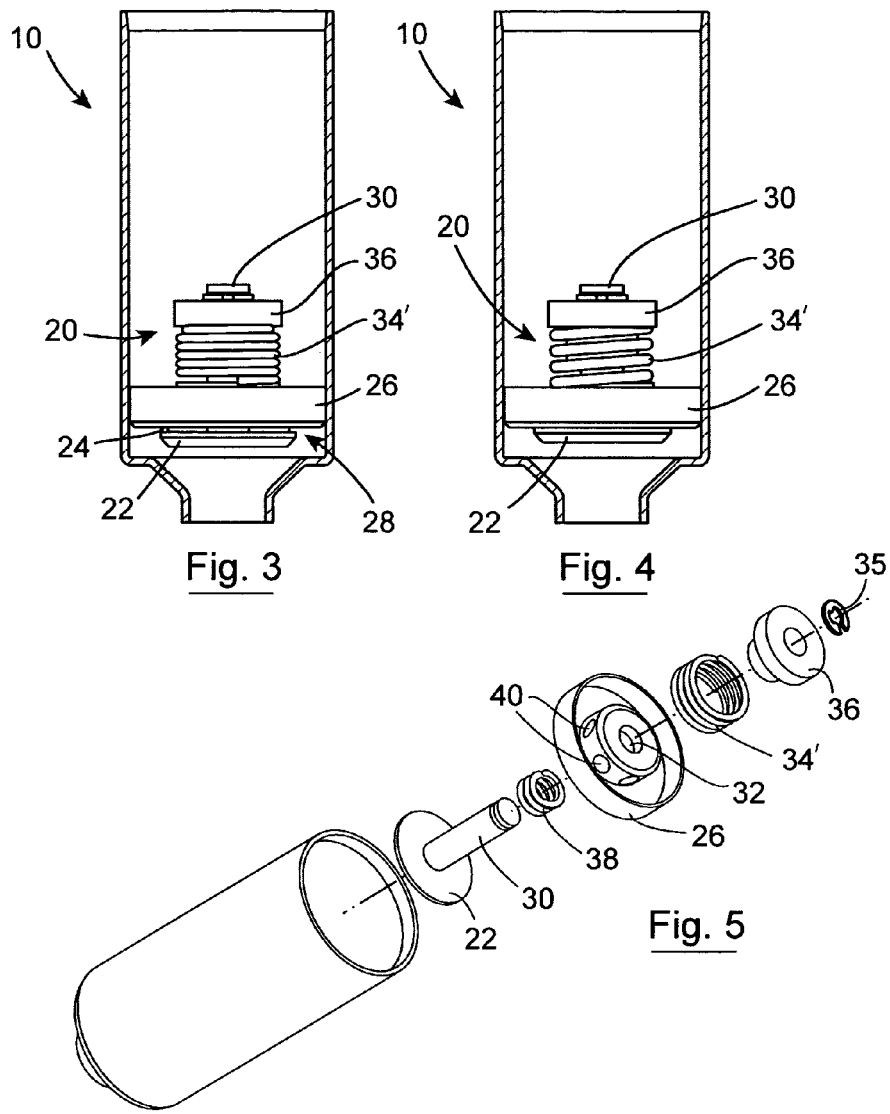
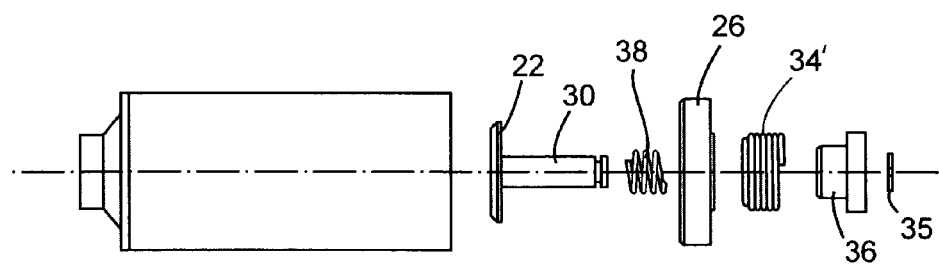

HEAT PIPE FOR A SOLAR COLLECTOR

This is a national stage of PCT/IE08/000,041 filed Apr. 7, 2008 and published in English, which has a priority of United Kingdom no. 0706700.2 filed Apr. 5, 2007, hereby incorporated by reference.

The present invention relates to a heat pipe for a solar collector for converting solar radiation into heat and to transfer the latter with the maximum possible efficiency to a fluid heat transferring means (e.g. water or air) whereby the heat can be utilised in a domestic or industrial application, for example to heat a domestic hot water or central heating system.

A solar collector typically comprises a number of heat pipes, the essential function of which is to transfer and to distribute heat by vaporization and condensation of a working fluid (heat-transfer medium). The principal feature of these is that the energy which is required for the flow of the liquid and the vapour in the presence of the gravity pull and in relationship with the losses due to sliding friction is completely provided by the heat source, so that no external pumping source is necessary. A known solar collector is disclosed in GB2103350.

Each heat pipe of the solar collector typically comprise a radiation absorbing plate for absorbing solar radiation and an elongate tube containing a heat transfer medium having an evaporator section, in thermal contact with said radiation absorbing plate, and a condenser section, remote from said plate, said plate and said evaporator section of said elongate tube being enclosed within an evacuated radiation transparent enclosure to prevent heat loss.

The solar collector further comprises a heat collection manifold containing a fluid to be heated and having at least one heat tube receiving aperture therein for insertion of said condenser section of the elongate tube to permit heat transfer between the heat transfer medium within the condenser section of the elongate tube and the fluid contained within the heat collection manifold.

If heat is not removed from the condenser, or it is not removed at a high enough rate, the condenser will overheat and the heat, pipe and/or solar collector system may be damaged. Safety measures therefore, have to be provided to prevent this. It is desirable to devise a means whereby the maximum temperature of the condenser does not exceed a predetermined temperature. This can be achieved if the condensed working fluid is collected in the condenser compartment when the condenser reaches said predetermined temperature, rather than allowing the fluid to return to the evaporator. As a consequence, if heat continues to be applied to the evaporator, it gradually dries out and all the working fluid is held in the condenser, so that heat transfer between the evaporator and the condenser is interrupted.

WO 92/18820 discloses a heat pipe incorporating a valve means for selectively closing communication between the condenser and the evaporator of the heat pipe when the temperature of the condenser exceeds a predetermined value. The valve means comprises a valve plug having a valve head engageable against a valve seat. A thermally responsive control means, such as a spring formed from memory metal or a bimetallic device, is provided for moving the valve head between a first position, wherein the valve head engages the valve seat to close communication between the evaporator and the condenser, and a second position, wherein the valve head is spaced from the valve seat to allow vapour to flow from the evaporator into the condenser and to allow condensed liquid to flow from the condenser back into the evaporator.

A problem with the arrangement disclosed in WO 92/18820 is that increases in pressure within the evaporator, due to vapourisation of the liquid heat transfer medium and the thermal expansion of vapour and gases therein, can act against the valve head to lift the valve head off the valve seat and allow condensate within the condenser to drain back into the evaporator, impeding the ability of the valve means to control the temperature within the condenser.

STATEMENTS OF INVENTION

According to the present invention there is provided a heat pipe for a solar collector comprising a radiation absorbing plate for absorbing solar radiation and an elongate tube containing a heat transfer medium having an evaporator section, in thermal contact with said radiation absorbing plate, and a condenser section remote from said plate, said radiation absorbing plate and said evaporator section of said elongate tube being enclosed within an evacuated radiation transparent enclosure, a valve means being provided for selectively closing communication between the condenser section and the evaporator section of the heat pipe when the temperature within the condenser section exceeds a predetermined value, the valve means comprising a valve head engageable against a valve seat, thermally responsive control means being provided for moving the valve head between an open position, wherein the valve head is spaced from the valve seat to allow vapour to flow from the evaporator section into the condenser section and to allow condensed liquid to flow from the condenser section back into the evaporator section, and a closed position, wherein the valve head engages the valve seat to close communication between the evaporator section and the condenser section, wherein the valve head is provided on a side of the valve seat downstream of the condenser section and upstream of the evaporator section and/or the valve head is moveable from its open to its closed position in a direction towards the condenser section whereby, when the valve head is in its closed position, an increase in pressure within the evaporator section acts against the valve head to urge the valve head against the valve seat.

Preferably the thermally responsive control means is in thermal contact with fluid contained within the condenser section of the heat pipe. The thermally responsive control means may comprise a thermally responsive member in the form of a spring formed from memory metal or a bimetallic device, said thermally responsive member acting upon the valve head to urge the valve head towards its closed position when the temperature of the thermally responsive member reaches or exceeds a predetermined value.

Preferably the valve seat is provided around a flow passage for fluid communication between the evaporator section and condenser section, whereby the valve head is moveable between its open and closed positions to control the flow of fluid through said flow passage.

Preferably said valve means comprises a lift valve. Preferably the valve head is provided on a distal end of a valve pintle extending through said flow passage into the condenser section whereby the thermally responsive member is located within the condenser section, the thermally responsive member acting upon said valve pintle to control movement of the valve head between its open and closed positions.

Biasing means, such as a compression spring, may be provided for urging the valve head away from the valve seat towards its open position, against the action of the thermally responsive member.

Preferably the flow passage is defined in a support plate mounted within an end region of the condenser section, said valve pintle extending through an aperture in said support plate, said thermally responsive member being provided on a side of said support plate remote from said valve head whereby said thermally responsive member is fully exposed to the working fluid within the condenser section. Preferably the biasing means is provided on a side of said support plate opposite said thermally responsive member and adjacent said valve head.

The heat pipe containing a working fluid comprises an evaporator section, interconnected via an aperture section to a condenser section and a regulating means for limiting the maximum temperature within the condenser section to a predetermined maximum temperature. The regulating means is a thermo-mechanical flow control valve. The thermo-mechanical flow control valve comprises a lift valve. The lift valve is activated by a temperature sensitive member. The temperature sensitive member may comprise a helical spring that acts upon the lift valve. Alternatively the temperature sensitive member comprises a plurality of discs that act upon the lift valve.

A biasing means, such as a spring, is provided to reposition the lift valve to its original position when the temperature sensitive member reverts to its original position.

The flow control valve seals the evaporator section from the condenser section in a directional motion from the evaporator section towards the condenser section. An increase in pressure within the evaporator section causes a tighter seal between the valve head and the valve seat of the control valve.

The temperature sensitive member may comprise a bi-metal or a shape memory alloy.

BRIEF DESCRIPTION OF THE DRAWINGS

The invention will be more clearly understood from the following description given by way of example only, with reference to the accompanying drawings, in which:—

FIG. 3 is an elevational, partially cross sectional view of an assembled condenser with a flow control valve in an open position according to a first embodiment of the invention;

FIG. 4 is a view similar to FIG. 3 of the assembled condenser with the flow control valve in a closed position in the first embodiment of the invention;

FIG. 5 is an exploded view of the condenser of FIGS. 3 and 4 illustrating the constituent components of the condenser in a first embodiment of the invention;

FIG. 6 is an exploded plan view of the condenser of FIG. 5;

DETAILED DESCRIPTION

Figure 1:
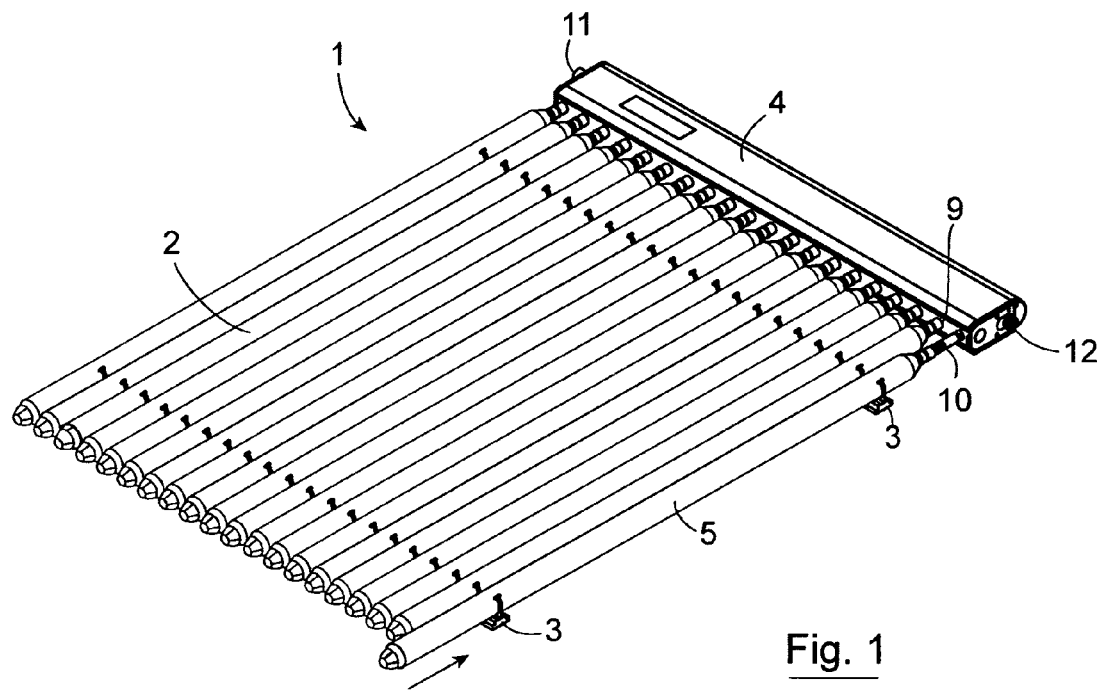
FIG. 1 is a perspective view of a solar collector.
Figure 2:
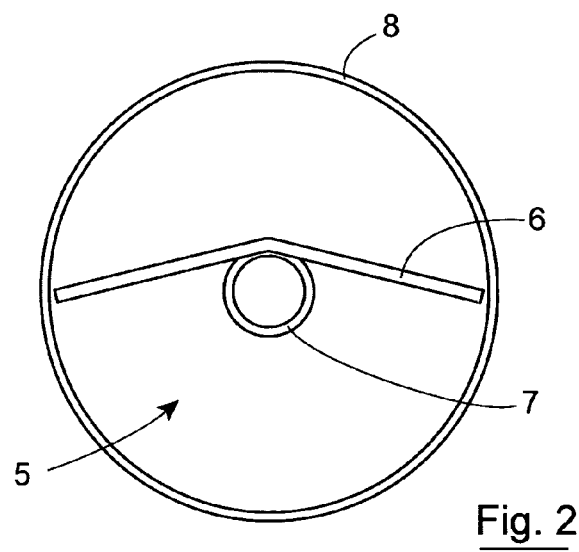
FIG. 2 is a sectional view through a heat pipe of the solar collector of FIG. 1.
Figure 7:
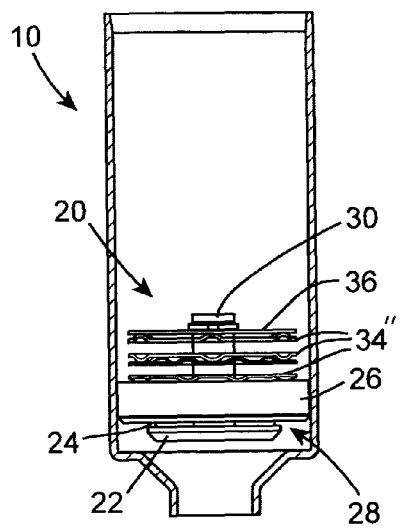
FIG. 7 is an elevational, partially cross sectional view of an assembled condenser with a flow control valve in an open position according to a second embodiment of the invention.
Figure 8:
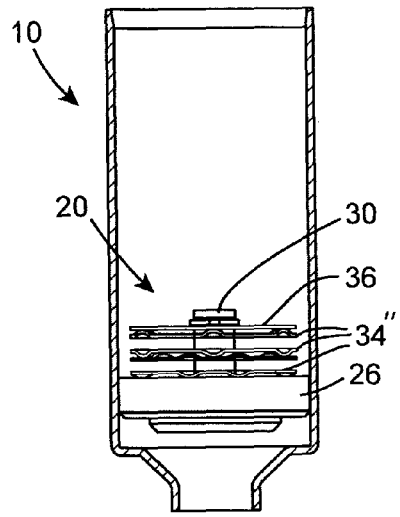
FIG. 8 is a view similar to FIG. 7 of the assembled condenser with the flow control valve in a closed position in the second embodiment of the invention.
Figure 9:
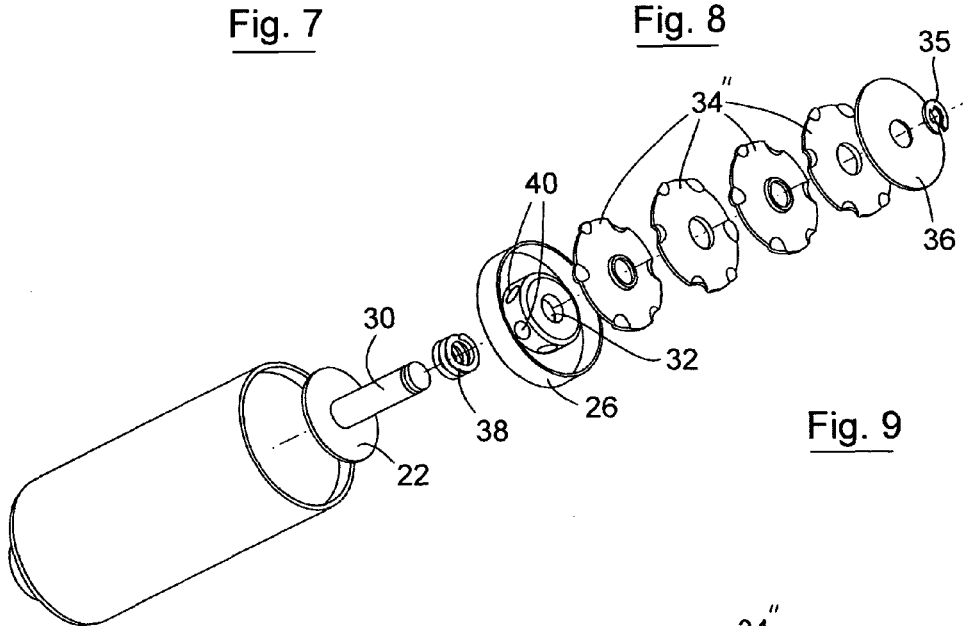
FIG. 9 is an exploded view of the assembled condenser of FIGS. 7 and 8 illustrating the constituent components of the condenser of the second embodiment of the invention.
Figure 10:
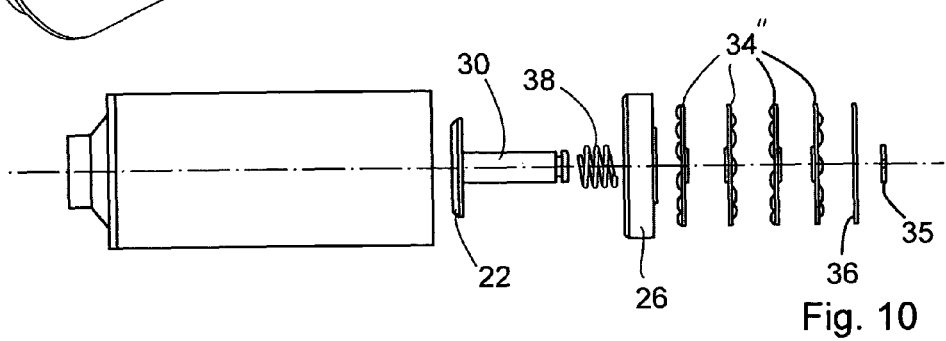
FIG. 10 is an exploded plan view of the condenser of FIG. 9.

As illustrated in FIG. 1 and FIG. 2, a solar collector 1 comprises a plurality of heat pipes 2 arranged in parallel on a support rail assembly 3 that are inserted into a manifold 4. Each heat pipe comprises an evaporator section 5, comprising a radiation absorbing plate 6 for absorbing solar radiation and a portion of an elongate tube 7, containing a working fluid (heat transfer medium), in thermal contact with said radiation absorbing plate 6. The evaporator section 5 is enclosed within an evacuated radiation transparent enclosure 8 to prevent heat loss.

Each heat pipe 2 includes a condenser section 10 at a distal end of the elongate tube 7 remote from the evaporator section 5, wherein the vaporised working fluid evaporated in the evaporator section 5 is condensed before draining back down into the evaporator section 5.

The condenser section 10 of each heat pipe 2 is inserted into a manifold 4 via manifold apertures 9, whereby heat transfer can take place between the condenser sections 10 of the heat pipes 2 and the heat transfer fluid (e.g. water) contained within the manifold 4. The manifold 4 includes inlet and outlet pipes 11, 12 to allow the heat transfer fluid in the manifold 4 to be circulated through a heating system.

To achieve the desired temperature limitation of the working fluid within the condenser section 10, a flow control valve 20 is provided between the evaporator section 5 and the condenser section 10 to selectively interrupt communication between said sections when the temperature within the condenser section 10 exceeds a predetermined maximum $T_o$, as illustrated in FIG. 3, FIG. 4, FIG. 7 and FIG. 8.

The flow control valve 20 closes fluid communication between the condenser section 10 and the evaporator section 5 when the temperature of the fluid within the condenser reaches the predetermined maximum $T_o$ to prevent the return of condensed fluid from the condenser section 10 to the evaporator section 5. The flow control valve 20 can be provided in an adiabatic section of the elongate tube 7 between the evaporator section 5 and the condenser section 10 or at the entrance to the condenser section 10.

The flow control valve 20 operates such that, when the predetermined temperature $T_o$ is reached, part or all of the working fluid is trapped in the condenser section 10 and additional working fluid wanting to enter the condenser section 10 from the evaporator section 5 is prevented from doing so.

As soon as the temperature around the flow control valve 20 decreases to below $T_o$, the flow control valve opens and the high efficient transport of energy inside the heat pipe from the evaporator section 5 to the condenser section 10 continues through the working fluid.

In a first embodiment of the present invention, illustrated in FIGS. 3 to 6 the flow control valve 20 consists of a valve head 22 engageable against a valve seat 24 provided on a peripheral region of a support plate 26 surrounding a flow passage 28 to selectively close communication between the evaporator section 5 and the condenser section 10 through the flow passage 28. The valve head 22 is mounted on a valve pintle 30 extending through a central aperture 32 in the support plate 26.

A temperature sensitive member, which in this case is in the form of a coil of memory metal 34', acts between the support plate 26 and a collet or seat 36 located on the valve pintle 30 on the opposite side of the support plate 26 to the valve head 22 and is secured in position by means of a circlip 35, to urge the valve head 22 towards the valve seat 24 and to close the flow control valve 20 when the temperature of the temperature sensitive member 34 exceeds a predetermined limit. A return spring 38 is located around the pintle 30 to act between the valve head 22 and the support plate 26 to bias the valve head 22 away from the valve seat 24.

A plurality of flow apertures 40 are provided in the support plate 26 around the flow passage 28 to allow communication between the condenser section 10 and the flow passage 28 and to permit the passage of the working fluid between the condenser section 10 and the evaporator section 5, via the flow passage 28, when the valve head 22 is in its open position.

In the invention, the flow path from, the condenser is matched with the flow rate from the evaporator section. The cross sectional area at the entrance to the condenser is matched to that of the drain holes. The area of the gap between the valve seat and valve head is also greater than the area of the drain holes so that there are no flow restrictions in the system. For example:— cross sectional area at entrance to condenser: 30 mm$^2$
area of drain holes: 29 mm$^2$
area of gap between valve seat and valve head: 53 mm$^2$ As will be particularly apparent from FIG. 3 and FIG. 4, the valve head 22 engages the valve seat 24 on the side of the support plate 26 facing the evaporator section 5 of the heat pipe 2. Therefore, when the valve is in its closed position, as illustrated in FIG. 4, an increase in fluid pressure within the evaporator section 5, due to thermal expansion of the gases within the evaporator section 5 and increased vapour pressure therein due to evaporation of the working fluid within the evaporator section 5, acts against the valve head 22 to urge the valve head 22 against the valve seat 24 to prevent the risk of leakage past the valve due to such pressure increase within the evaporator section 5.

To aid the manufacturability of the heat pipe 2, the flow control valve 20 is constructed in such a way that it can be assembled externally before insertion into an end of the condenser section 10 of the heat pipe 2.

In a second embodiment of the present invention, illustrated in FIGS. 7 to 10, the temperature sensitive member 34" comprises one or more bimetallic discs. The second embodiment is otherwise identical to the first embodiment. Such bimetallic discs can be set to temperatures of up to 135 degrees Centigrade and are therefore particularly suitable for heat pipes in industrial or large scale use. A memory metal spring however generally operates at a temperature of up to 95 degrees Centigrade and is more suitable therefore for domestic type applications.

In the invention the travel distance of the temperature sensitive member is minimised to ensure a rapid response of the valve when the activation temperature is reached. The use of a central spindle or pintle ensures that the temperature sensitive member remains concentrically positioned and the opportunity for snagging is thereby minimised. The use of the central spindle also aids the manufacturing process as the unit can be readily pre-assembled. In the case of bimetallic discs the spindle provides a definite position for each disc to locate. The bimetallic discs also have a relatively small outer diameter thereby reducing the risk of snagging on the inner walls of the condenser body. The overall length of the assembled valve is short, allowing for utilisation in smaller/restricted condenser bodies.

Various modifications and variations to the described embodiments of the invention will be apparent to those skilled in the art without departing from the scope of the invention as defined in the appended claims. Although the invention has been described in connection with specific preferred embodiments, it should be understood that the invention as claimed should not be unduly limited to such specific embodiments.

The invention claimed is:

1. A heat pipe for a solar collector comprising a radiation absorbing plate for absorbing solar radiation and an elongate tube containing a heat transfer medium having an evaporator section, in thermal contact with said radiation absorbing plate, and a condenser section remote from said plate, said radiation absorbing plate and said evaporator section of said elongate tube being enclosed within an evacuated radiation transparent enclosure, a valve means being provided for selectively closing communication between the condenser section and the evaporator section of the heat pipe when the temperature within the condenser section exceeds a predetermined value, the valve means comprising a valve head engageable against a valve seat, thermally responsive control means being provided for moving the valve head between an open position, wherein the valve head is spaced from the valve seat to allow vapour to flow from the evaporator section into the condenser section and to allow condensed liquid to flow from the condenser section back into the evaporator section, and a closed position, wherein the valve head engages the valve seat to close communication between the evaporator section and the condenser section, wherein the valve head is provided on a side of the valve seat facing the evaporator section and the valve head is moveable from its open to its closed position in a direction towards the condenser section whereby, when the valve head is in its closed position, an increase in pressure within the evaporator section acts against the valve head to urge the valve head against the valve seat.

2. The heat pipe as claimed in claim 1 wherein the thermally responsive control means is in thermal contact with fluid contained within the condenser section of the heat pipe.

3. The heat pipe as claimed in claim 1 wherein the thermally responsive control means comprises a thermally responsive member, said thermally responsive member acting upon the valve head to urge the valve head towards its closed position when the temperature of the thermally responsive member reaches or exceeds a predetermined value.

4. The heat pipe as claimed in claim 3 wherein the thermally responsive member comprises a spring formed from memory metal.

5. The heat pipe as claimed in claim 3 wherein the thermally responsive member comprises a bimetallic device.

6. The heat pipe as claimed in claim 1 wherein the valve seat is provided around a flow passage for fluid communication between the evaporator section and condenser section, whereby the valve head is moveable between its open and closed positions to control the flow of fluid through said flow passage.

7. The heat pipe as claimed in claims 1 wherein the valve head is provided on a distal end of a valve pintle extending through said flow passage into the condenser section whereby the thermally responsive member is located within the condenser section, the thermally responsive member acting upon said valve pintle to control movement of the valve head between its open and closed positions.

8. The heat pipe as claimed in claim 7 wherein the flow passage is defined in a support plate mounted within an end region of the condenser section, said valve pintle extending through an aperture in said support plate, said thermally responsive member being provided on a side of said support plate remote from said valve head whereby said thermally responsive member is fully exposed to the working fluid within the condenser section.

9. The heat pipe as claimed in claim 1 wherein the valve means comprises a lift valve.

10. The heat pipe as claimed in claim 1 comprising biasing means, for urging the valve head away from the valve seat towards its open position, against the action of the thermally responsive member.

11. The heat pipe as claimed in claim 10 wherein the biasing means comprises a compression spring.

12. The heat pipe as claimed in claim 10 wherein the biasing means is provided on a side of said support plate opposite said thermally responsive member and adjacent said valve head.

13. A solar collector comprising a plurality of heat pipes as claimed in claim 1.

* * * * *